Aug. 20, 1935.  R. C. HUGHES  2,011,764
NOISELESS FLUID PRESSURE REGULATOR
Filed March 28, 1933
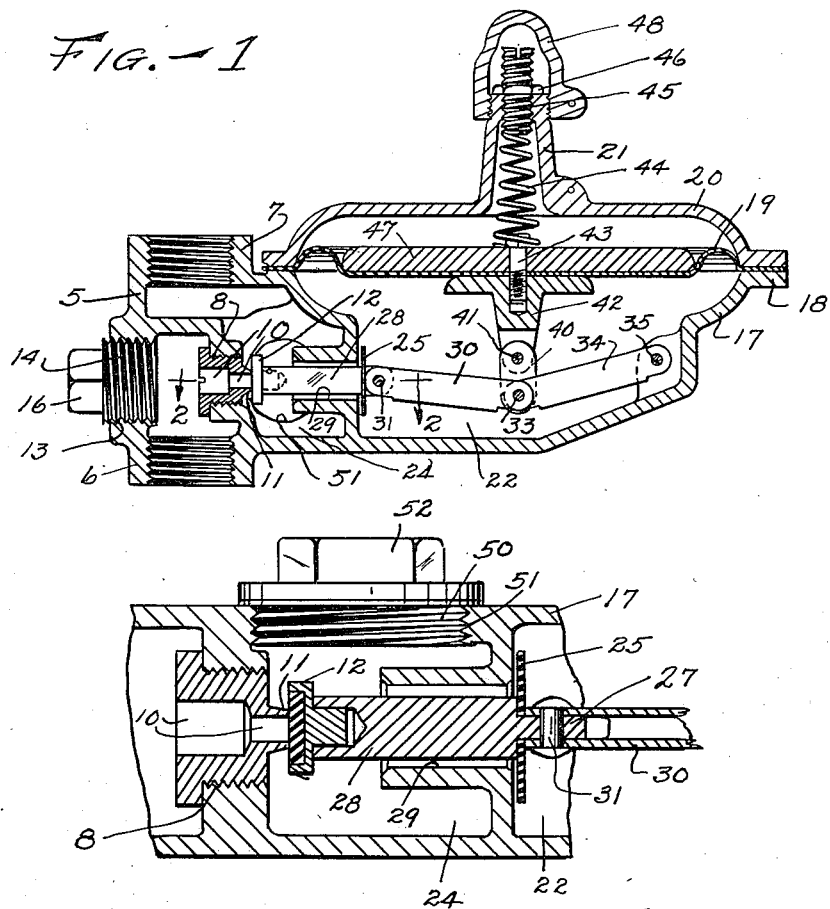
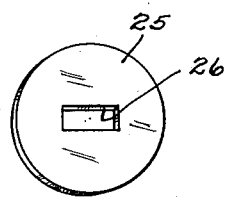
Inventor
RALPH C. HUGHES
By Frank D. Gray
Attorney Patented Aug. 20, 1935

2,011,764

UNITED STATES PATENT OFFICE 2,011,764

NOISELESS FLUID PRESSURE REGULATOR

Ralph C. Hughes, Anderson, Ind., assignor to Reynolds Gas Regulator Co., Anderson, Ind., a corporation of Indiana Application March 28, 1933, Serial No. 663,115

6 Claims. (Cl. 50—26)

My invention relates to improvements in noiseless fluid pressure regulators which automatically respond to changes in pressure in the outlet port by consequent variation in relative pressures on the inlet and outlet sides of the reducing valve intermediate such ports; and at the same time providing special packing means which yields thereby permitting forcing the valve member against a stationary apertured member as the result of varying pressures and thereby avoiding undesirable "chattering" or throbbing by such vibration of the valve member.

As an additional means of preventing undue vibration of the controlling valve member in response to variation in pressure in the port chambers and the connected chamber of the adjacent diaphragm casing, automatic polygonal thrust mechanism is directed through an elongated lateral opening of curved outline, said opening connecting the valve chamber and the diaphragm casing, and a flexible member carried by such thrust mechanism is positioned to contact the inner surface of the casing about the opening, to further muffle the "chattering".

It is a still further and special object of my present invention to provide a flexible muffler readily mountable detachably upon and carried by the axially movable valve actuating member, but on the inner end surface of the guide sleeve adjacent its inner end and within the diaphragm casing, so that said flexible muffler will engage such inner end surface at the time, or just before, the packing of the valve strikes the apertured plug in closing the valve.

The full nature of the invention will be understood from the following description and claims, and the accompanying drawing in which,—

Figure 1 is a central vertical section through the regulator, certain portions being in elevation;

Figure 2 is a detail sectional view taken in the plane indicated by the line 2—2 of Fig. 1, and Figure 3 is a perspective view of the flexible and apertured muffler carried by one of the valve members.

My noiseless pressure regulator is herein disclosed in an embodiment providing a valve casing 5 which is very skeleton-like in structure having many threaded apertures connecting chambers thereof some of which will ordinarily be filled with plugs threaded for detachable insertion therein, and others receiving connecting elements therethrough, as will later be explained in detail. This valve casing is integral and includes a portion 17 which will serve as the lower section of a diaphragm casing, and will for that reason provide a peripheral flange 18 for receiving thereon the periphery of a flexible diaphragm 19.

The valve portion of said integral casing 5 will have a threaded inlet port 6 and another oppositely directed and designated 7, serving as an outlet port. The intermediate portion opposite the diaphragm casing has a threaded aperture 8 in alinement with an outer alined aperture 13 for receiving a threaded plug 14.

This plug 14 is solid and has a non-circular external end 16 for engagement by a suitable tool to rotate the same for detachment for inserting another tool through the opening 13 for removal of the axially apertured plug. The intermediate threaded aperture 8 forms an elongated sleeve opening which may readily receive therein an elongated plug externally threaded to be inserted in the aperture 8, this plug having an axial aperture 10 which is stepped to provide a reduced portion directed toward the section 17 and having an extended thin annular rim 11 forming a valve seat, against which valve packing carried in the annular rim 12 of the movable valve plunger 28, may be thrust to close the reducing valve used in my mechanism disclosed.

In my structure shown, the plunger member 28 is formed in two parts, the rim member 12 having an integral plug detachable from an axial socket in the larger member which is polygonal in cross section for guiding movement in the circular or cylindrical opening 29. The larger member 28 has an apertured lug 27 extending into the chamber 22 of the section 17. A toggle actuating mechanism for the plunger 28 is formed by links 30 and 34 pivoted together by pin 33 which also pivots the links to the lower end of the actuating link 40. The other end of the link 34 is pivoted to an inner web of the section 17 by pin 35, and the opposite end of link 30 is pivoted to lug 27 by pin 31. Straightening the toggle members will therefore thrust the plunger 28 and valve packing against the apertured rim 11 and close the valve.

It is to be understood that the entering gas at the port 6 is designed to pass through the axial aperture 10 and when permitted to pass through, by movement of the member 12 away from rim 11, will pass upwardly, outside the diaphragm casing, and out through the port 7. At the same time, gas pressure will be maintained in the chamber 22 by communication with valve chamber 24 through sleeve 29.

The guidance of the polygonal plunger 28 in the circular opening 29 or interior of the sleeve provides ample side openings through which the relative pressure in the two chambers 22 and 24 may result in uniformity as desired. No actual flow of fluid will ordinarily occur through these openings, however. Above the diaphragm 19 I provide an upper section 20 of the casing, the section being upwardly extended as a dome 21 having threaded surfaces within and externally, the inner surface receiving therein an adjustable threaded plug 45 movable toward and from the diaphragm 19 and having a lock nut 46 at the peak of the dome 21.

A cap 48 is also provided with an inner threaded surface for mounting upon the upper end of the dome 21. The said diaphragm 19 is clamped between the plates 42 and 47, and the pressure coil 44 mounted between the plug 45 and said plate 47, a screw member 43 being inserted through a central aperture in the plate 47 and into an upper socket in the plate 42 adjustably, the upper end or head of the screw properly guiding the lower end of the coil spring 44, as will be understood. A lower forked end of the plate 42 is pivoted by the pin 41 with the link 40. Thereby pressure of the gases beneath the diaphragm 19 in the chamber 22 will determine the relative position of the toggle links 30 and 34, and thereby automatically open or close the reducing valve 12 in response to the demand at the outlet 7, and the consequent demand and pressure in the chamber 24.

Upon the lug 27 I mount the muffling or baffle member 25 which is circular and provided with an elongated slot 26 at its center and through which the lug 27 is threaded to carry said flexible baffle member 25 into position facing the vertical surface of the flange about the inner end of the sleeve 29 within the chamber 22. Just sufficient space is between the ends of the link 30 and the shoulder about the lug 27 to receive the thickness of the baffle member 25, to make the mounting of said baffle positive and certain and its movement sure.

The baffle element 25 approaches the shoulder at the sleeve flange, at the surface inside the chamber 22, as the valve member 12 approaches the rim 11 to close the valve. Since the latter distance traveled by such baffle in approaching the partition shoulder adjacent the sleeve 29, will gradually be at a slower rate, such approach will sufficiently cut off the stream of gas from passing through the aperture in the sleeve 29, so that the rumble or chatter in the chamber 24 will not be increased by being communicated to the diaphragm 19, and will be suppressed rather than increase the resulting vibratory movement of valve parts upon opening or closing the valve. Because of the function which it is desired that this baffle element should perform, it is intended to be provided of flexible material such as a suitable rubber composition.

The side wall, intermediate the inlet and outlet ports 6 and 7, of the chamber 24 has a relatively large threaded opening 51, preferably of a size permitting manual entrance for repair purposes, which may be closed by a threaded plug 50 having a non-circular external portion for applying an actuating tool for detachable connection of the plug. While the structure here shown for mounting the skeleton casing and connected orifices with detachable plugs has been found highly efficient and practicable, it is not desired to limit the present application to the particular arrangement of detailed structure immediately adjacent the chamber 24; but the baffle means before explained carried by the lug 27 extending into the diaphragm chamber 22 and movable toward and away from the sleeve support to lessen the vibration of the valve member, is recited as novel and of great utility, and claim for such structure is made herein broadly and positively.

The normal position of the baffle element 25 will be slightly withdrawn from the partition surface or vertical surface of the flange about the inner end of the sleeve 29 within the chamber 22, and the valve member 12 is ordinarily somewhat open as will be understood, so that an increased demand will likely decrease the pressure in the chambers 22 and 24, thereby lowering the diaphragm 19 and opening the valve, as well as moving the member 25 further from said partition surface.

It has been found that in gas regulators of either the spring or dead weight type, the action of the gas is such that a consequent chattering or rumbling noise in the regulator is communicated to the pipe and often becomes very annoying. This usually happens by eddying of the gas in chamber 24 causing the packing in valve member 12 to strike the face of the rim 11 very rapidly and setting up this rumbling which is communicated around the plunger 28 to the chamber 22 reaching the main diaphragm 19 where the rumbling is amplified and the eddying of the gases accelerated.

The use of this baffle 25 carried by the lug 27 of the plunger and moving with it within the diaphragm chamber 22, has been found to have the desirable function of dampening out the eddying in the chamber 22 that such throbbing originally existing in chamber 24 is not communicated to the main diaphragm, and therefore eliminates "chattering" and substantially results in a noiseless valve regulator. It is to be understood that the non-chattering device herein disclosed is applicable to regulator structures having plunger members movable through an apertured guide and adapted for actuating a reduction valve intermediate the inlet and outlet ports of a pressure regulator, a flexible and supersensitive baffle plate 25 being mounted on the lug 27 at the end of the plunger 28 remote from the valve.

I claim as my invention:

1. A noiseless gas regulator comprising a valve casing having a valve seat and a diaphragm casing communicating with said valve casing through an elongated guide sleeve, a valve actuating member movable through said guide sleeve toward and from said valve seat and having a valve member directed toward the valve seat, and a reduced opposite end forming an apertured lug for insertion through said sleeve into said diaphragm casing and having actuating connections within the diaphragm casing, and a baffle member carried by said lug adjacent said guide sleeve for dampening the gas eddies in said casings and thereby eliminating rumbling of the valve.

2. A noiseless gas regulator comprising a composite casing including a valve casing having a valve seat and a diaphragm casing separated by a vertical partition wall, the said casings communicating through a tubular guide opening, a polygonal valve actuating member movable longitudinally through said guide opening toward and from said valve seat and having a valve member at one end directed toward said valve seat, and a reduced opposite end lug within said diaphragm casing having actuating connections with the diaphragm within the diaphragm casing, and a circular, baffle, disc member carried by said reduced end lug adjacent said guide opening and in parallelism with the inner face of said partition wall for reducing speed of said valve member, and for dampening the gas eddies in said composite casing and thereby eliminating rumbling of the valve.

3. A noiseless gas regulator comprising a composite casing including a valve casing having an inner chamber and alined inlet and outlet ports separated by an apertured sleeve forming a valve seat at one end, and a diaphragm casing spaced from said inner chamber by a vertical partition having a guide opening therethrough and spaced from said valve seat, a valve plunger movably mounted through said guide opening having a valve member directed toward the said valve seat to open or close said sleeve aperture, and a reduced pivot end lug within said diaphragm casing adjacent the face of said partition, and a baffle disc member carried by said reduced pivot end movable toward and away from said guide opening, spring means in said diaphragm casing for normally withdrawing said valve member from said valve seat, means actuated by gas pressure beneath said diaphragm for closing said valve, and moving said baffle member, thereby dampening the gas eddies in said valve casing and eliminating rumbling of the valve.

4. A noiseless gas regulator comprising a casing divided by a vertical apertured partition into a pressure chamber for valve control mechanism and a valve chamber having inlet and outlet ports leading thereto with a valve member mounted detachably between said ports and provided with an intermediate opening having a valve seat, a plunger mounted for movement in the partition aperture connecting said valve and pressure chambers with one end toward said valve seat to open or close the valve selectively, and a baffle member carried by and movable with the opposite end of said plunger toward and from said aperture for dampening gas eddies and eliminating rumbling of the valve.

5. A noiseless gas regulator comprising an integral casing having a pressure and a valve chamber connected by a vertical and apertured partition, an apertured valve member mounted detachably in said valve chamber and providing an apertured valve seat therein connecting inlet and outlet ports, an actuating valve element movable through said partition aperture by pressure exerted in said pressure chamber toward said valve seat, and a flexible baffle member carried by said movable valve element within said pressure chamber and adjacent the said aperture in said partition for dampening gas eddies and eliminating rumbling of the valve.

6. A noiseless gas regulator comprising a composite casing including a valve casing and a diaphragm casing separated by a partition wall having a hollow cylindrical opening, the valve casing including inlet and outlet ports separated by an axially apertured sleeve in alinement with said cylindrical opening, a polygonal plunger movably mounted in said cylindrical opening to provide elongated openings between said plunger and cylindrical opening for communication between the two casings, a diaphragm mounted in said diaphragm casing for movement therein in response to fluid pressure on one surface of the diaphragm, a valve member carried on one end of said plunger for closing and opening movement toward and away from said sleeve, means connected with said diaphragm for normally opening said valve member, and under said fluid pressure tending to close the valve, and a flexible baffle member carried in the diaphragm casing by said plunger on the end opposite the valve member for approaching and alternately receding from said cylindrical opening in said partition wall to dampen the gas eddies in the casings and thereby eliminate rumbling of the valve.

RALPH C. HUGHES.